United States Patent [19]
Kim

[11] Patent Number: 5,359,656
[45] Date of Patent: Oct. 25, 1994

[54] ADAPTIVE ECHO CANCELLATION APPARATUS

[75] Inventor: Jong-Il Kim, Incheon, Rep. of Korea

[73] Assignee: Daewoo Electronics Co., Ltd., Seoul, Rep. of Korea

[21] Appl. No.: 74,305

[22] Filed: Jun. 9, 1993

[30] Foreign Application Priority Data

Jun. 9, 1992 [KR] Rep. of Korea .............. 92-9950

[51] Int. Cl.$^5$ .............................................. H04M 9/00
[52] U.S. Cl. ...................................... 379/410; 379/406; 379/407; 379/411; 379/390; 379/402; 379/391; 379/392
[58] Field of Search ............. 379/410, 392, 390, 391, 379/402, 406, 407, 411

[56] References Cited

U.S. PATENT DOCUMENTS

| | | | |
|---|---|---|---|
| 4,007,341 | 2/1977 | Sourgens et al. | 379/411 |
| 4,633,046 | 12/1986 | Kitayama et al. | 379/411 |
| 5,042,026 | 8/1991 | Koike et al. | 379/411 |
| 5,131,032 | 7/1992 | Esaki et al. | 379/406 |

*Primary Examiner*—James L. Dwyer
*Assistant Examiner*—Jacques M. Saint-Surin
*Attorney, Agent, or Firm*—William F. Pinsak

[57] ABSTRACT

An adaptive echo cancellation apparatus disclosed herein has three channels and a channel selection circuit. The first channel serves to block an outgoing digital signal from flowing to a transceiver. The second channel is used to directly couple the outgoing digital signal to the transceiver. The third channel serves to subtract a predicted echo signal, estimated by using the incoming digital signal, from the outgoing digital signal and to couple an error signal, representative of the difference therebetween, to the transceiver. The adaptive channel selection circuit is used to select one of the channels depending on the presence of the valid outgoing and incoming digital signals in order to effectively reduce the estimation operation. Further, the third channel is provided with a filter wherein the filter coefficients are adaptively updated by using the signs of a predetermined number of samples, thereby achieving a considerable reduction in the computational complexity.

8 Claims, 4 Drawing Sheets

ADAPTIVE ECHO CANCELLATION APPARATUS

FIELD OF THE INVENTION

The present invention relates to an adaptive echo cancellation apparatus for use with a digital communication system; and, more particularly, to an adaptive echo cancellation apparatus providing an improved echo cancellation function in an efficient manner.

DESCRIPTION OF THE PRIOR ART

Digital communication systems, for example, satellite communication systems, speaker-equipped or hand-free telephones, usually comprise two parts: a transceiver and an audio-processing circuit. The transceiver has a transmitter for transmitting a series of pulses, usually shaped by some form of a filter, on a communication line; and a receiver for detecting pulses being sent from a far end of a communication loop line. The audio-processing circuit is provided with an audio input circuit for producing a series of pulses corresponding to an audio signal to be transmitted; and an audio reproduction circuit for reproducing or recovering the original sound from the received pulses.

In such a digital communication system, sometimes, undesirable howling sounds may occur when the desired signal to be transmitted and its echo signal are simultaneously applied to the transmitter and a sudden fluctuation occurs on the echo path which is formed between the audio reproduction circuit and the audio input circuit. Therefore, the use of an echo canceller is need to remove such howling sounds and echoes that tend to degenerate the communication quality.

Accordingly, various types of echo cancellers for digital communication systems have been proposed. For example, U.S. Pat. No. 4,903,247 issued to Petrus J. van Gerwen et al. on Feb. 20, 1990 discloses an echo canceller employing two digital filters which generate a replica of the echo signal. The replica of the echo signal generated by the filter combination is used to cancel the echo components from a signal to be transmitted, by way of continuously updating the filter coefficients. While this prior art echo canceller is capable of performing the echo cancellation function in a relatively simple manner, computation of various replica signals and updating of the filter coefficients still lead to an increase in the computational complexity. To further lower the system efficiency, its estimational operation for each sample of an incoming signal is continuously carried out, even though such estimation is not needed when there is no outgoing signal.

SUMMARY OF THE INVENTION

It is, therefore, a primary object of the invention to provide an echo cancellation apparatus which is capable of providing a substantial reduction in the operational complexity.

It is another object of the invention to provide an echo cancellation apparatus which effectively reduces unnecessary estimation steps.

In accordance with the present invention, in a digital communication system having an audio-processing circuit and a transceiver which transmits an outgoing digital signal through a communication line and receives an incoming digital signal from the communication line, wherein the audio-processing circuit includes an audio input means for converting an audio waveform to the outgoing digital signal and an audio reproduction means for converting the incoming digital signal to an acoustic wave, there is provided an adaptive echo cancellation apparatus, which comprises: a first channel for blocking the outgoing digital signal from flowing to the transceiver; a second channel for directly coupling the outgoing digital signal to the transceiver; a third channel for subtracting a predicted echo signal, obtained by using the incoming digital audio signal, from the outgoing digital signal, and for coupling an error signal, representative of the difference between the outgoing and the incoming digital signals, to the transceiver; and the channel selection means, responsive to the outgoing digital signal and/or the incoming digital signal, for selecting one of the channels.

BRIEF DESCRIPTION OF THE DRAWINGS

The above and other objects and features of the instant invention will become apparent from the following description of the preferred embodiments taken in conjunction with the accompanying drawings, in which.

DETAILED DESCRIPTION OF THE PREFERRED EMBODIMENTS

Figure 1:
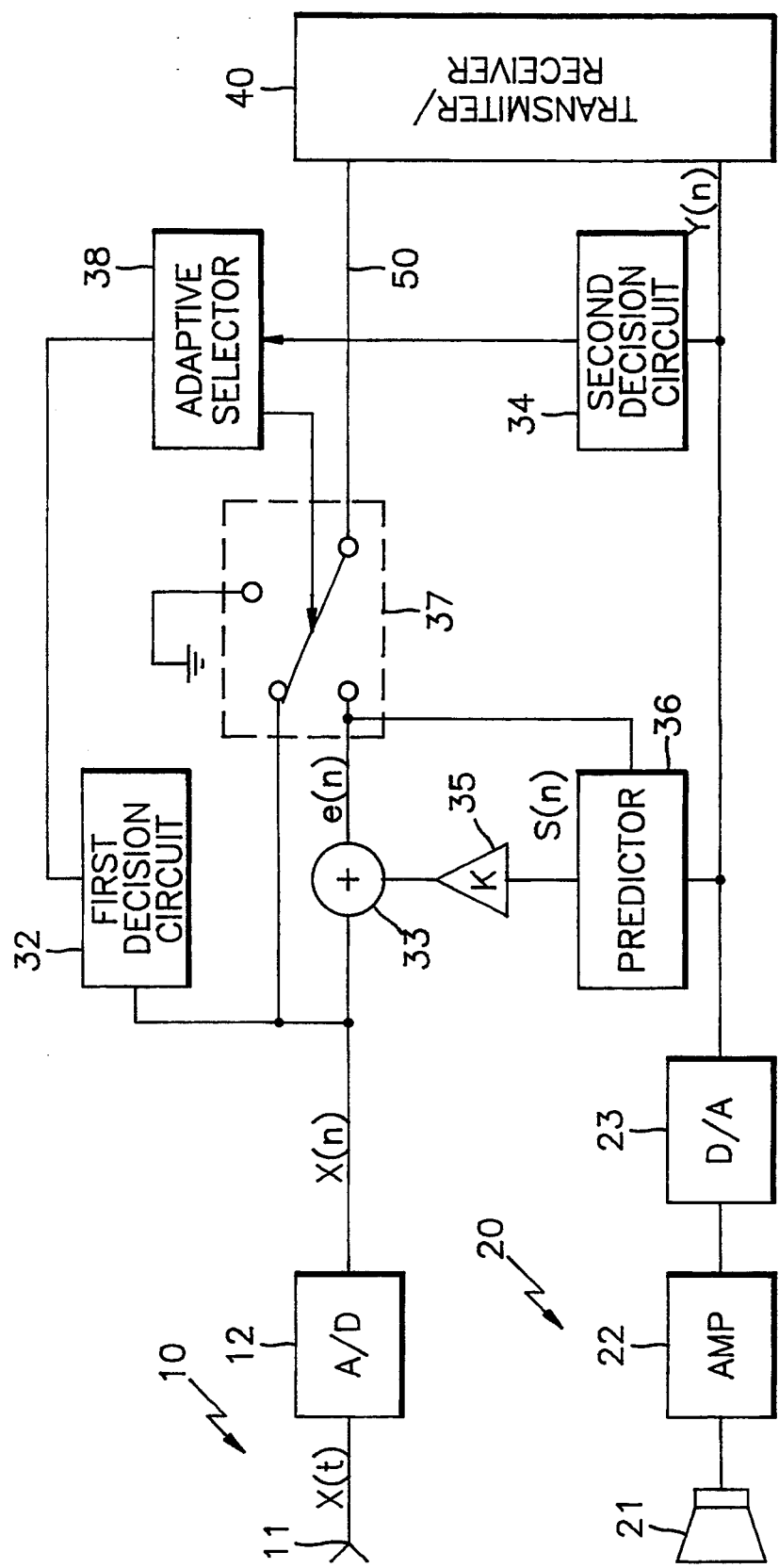
FIG. 1 represents a schematic diagram of a typical audio signal transmitting and receiving system which incorporates an adaptive echo cancellation apparatus in accordance with the present invention.

A typical digital communication system with an adaptive echo cancellation apparatus is shown in FIG. 1. As shown, the system includes a audio-processing parts 10 and 20, a transceiver unit 40, and echo-cancellation unit elements 32 to 38 therebetween.

The audio-processing unit normally consists of an audio input circuit 10 adapted to convert an audio sound to a digital signal X(n) for transmission, and an audio reproduction circuit 20 adapted to convert a digital signal received through the transceiver unit 40 to its original acoustic wave.

The audio signal to be transmitted is coupled to the audio input circuit 10, which is normally implemented through the use of an electroacoustic transducer 11, e.g., microphone, and an analog-to-digital(A/D) converter 12.

The electroacoustic transducer 11 is used to convert the audio waveform to an electrical analog signal X(t), while the A/D converter is adapted to convert the electrical analog signal X(t) to a digital transmission signal X(n), wherein n is a positive integer. As is known in the art, in the analog-to-digital conversion process, the electrical analog signal X(t) is sampled in a predetermined number of times and each sample's level is quantized to a four-bit binary code capable of expressing sixteen discrete values. As a result, the converted digital audio signal X(n) may have a plurality of samples and is sent to the transceiver unit 40 through the adaptive echo cancellation unit elements 32 to 38.

The transceiver unit 40 is used to couple the digital transmission signal X(n) to a communication line(not shown) and to receive the incoming digital signal Y(n) from the communication line.

The incoming digital signal Y(n) is then coupled to the audio-reproduction circuit 20 through the adaptive echo-cancellation unit elements 32 to 38. The audio-reproduction circuit 20 is adapted to convert the incoming digital signal Y(n) back to its original audio wave; and includes a digital-to-analog (D/A) converter 23, an amplifier 22 and an electroacoustic transducer, e.g., a loudspeaker 21.

The digital signal Y(n) is coupled to the D/A converter 23 which is used to reconstruct an electrical analog signal from the digital signal Y(n) in a reverse operation of the A/D converter.

The reconstructed incoming analog signal is then coupled to the amplifier 22; amplified by a predetermined gain factor; and converted by the loudspeaker 21 to an audio waveform.

As shown in FIG. 1, the adaptive echo cancellation unit elements coupled between the audio processing units 10 and 20, and the transceiver unit 40 are implemented by three channels C1, C2 and C3, and channel selection circuit elements 32, 34, 37, and 38 for selecting one of the channels.

A first channel C1 serves to block the outgoing digital signal X(n) from flowing to the transceiver unit 40. When the first channel C1 is selected, line 50 is coupled to the ground and the connection between the audio input circuit 10 and the transceiver unit 40 is opened. Accordingly, the outgoing digital signal X(n) is blocked from flowing to the transceiver unit 40.

A second channel C2 serves to directly couple the outgoing digital signal to the transceiver unit 40. That is: when channel C2 is selected, the output from the audio input circuit 11 is directly coupled to line 50.

A third channel C3 serves to subtract a predicted echo signal, estimated by using the incoming digital signal Y(n), from the outgoing digital signal X(n); and to couple an error signal e(n), representative of the difference therebetween, to the transceiver unit 40. The third channel C3 is provided with a predictor 36, an amplifier 35 and an adder 33 as will be described hereinbelow.

A selection circuit includes a switch 37, a first and a second decision circuits 32 and 34, and an adaptive selector 38.

The first and the second decision circuits 32 and 34, responsive to the outgoing digital signal X(n) and the incoming digital signal Y(n), serve to detect the presence of a valid outgoing digital signal X(n) and a valid incoming digital signal Y(n), respectively; and produce decision flag signals.

The adaptive selector 38 is connected to the first and the second decision circuits 32 and 34; and generates a channel selection signal.

The switch 37 serves to select one of the channels in response to the channel selection signal.

Figure 2:
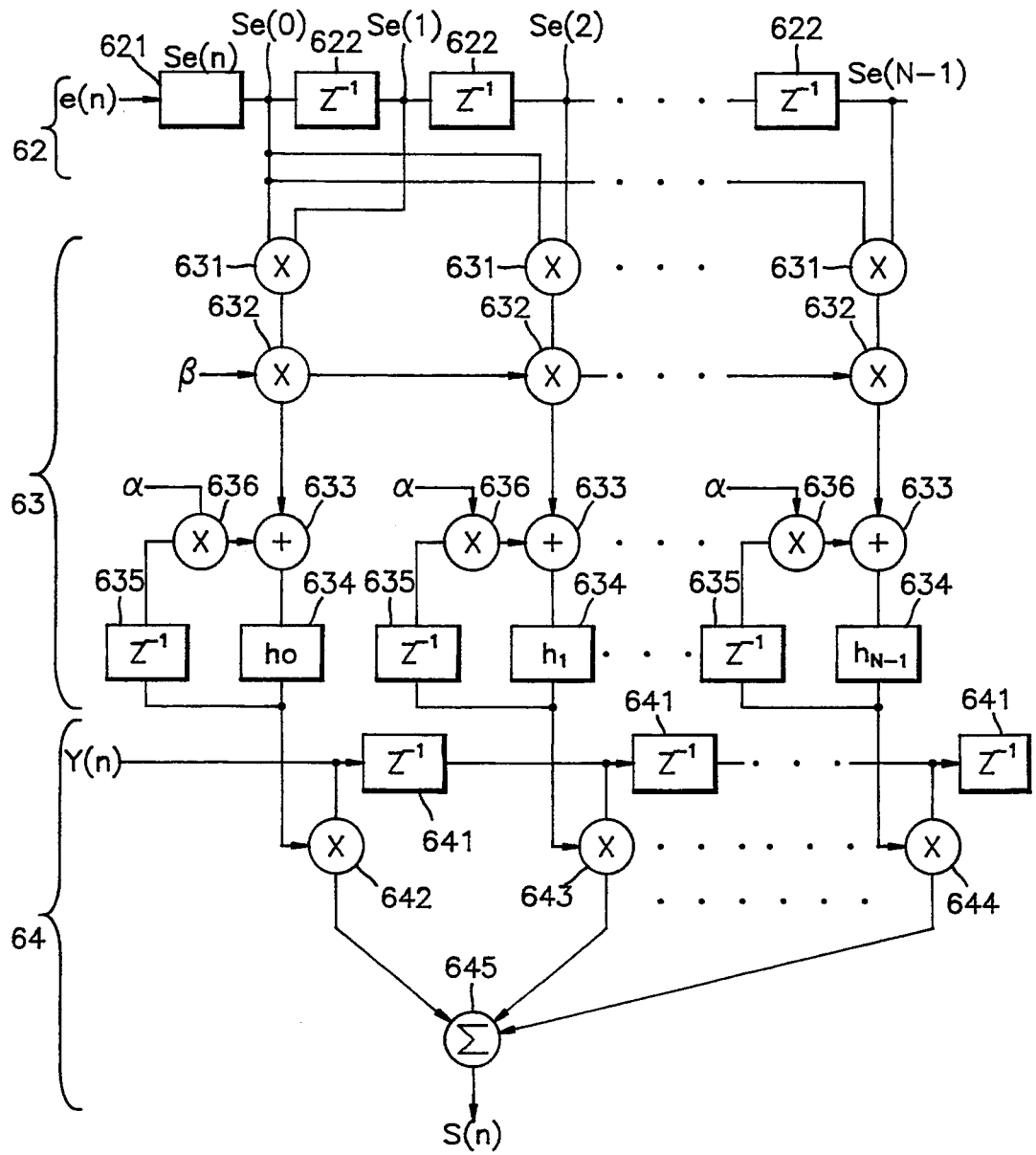
FIG. 2 provides a schematic diagram of a predictor employed in a preferred embodiment of the present invention.
Figure 3:
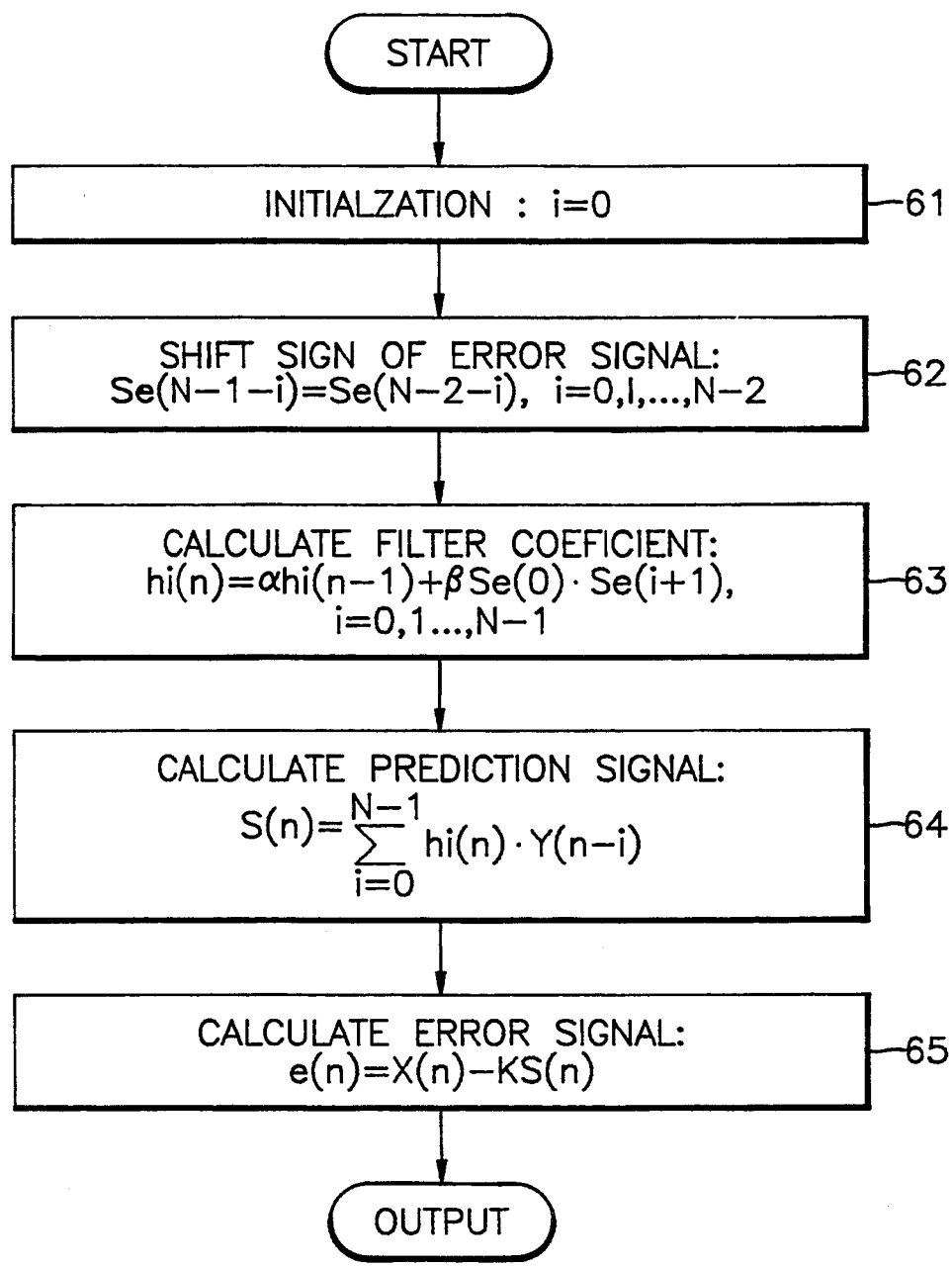
FIG. 3 is a flow chart illustrating the operation of the predictor shown in FIG. 2.

A hardware implementation scheme of the predictor 36 shown in FIG. 1 in accordance with a preferred embodiment of the present invention is illustrated in FIG. 2; and a flow chart depicting its operation is shown in FIG. 3.

As shown in FIGS. 2 and 3, the predictor 36 is provided with a filter employing a sign algorithm (see "Digital Coding of Waveforms", N. S. Jayand, Prentice-Hall Inc, 306(1984)), which is considerably fast and efficient.

First, in step 61, parameter i is initialized at 0. In step 62, a sign of the error signal Se(n) is extracted by a sign extraction circuit 621, which is readily ascertainable by the so-called "exclusive OR" logic function; and is sequentially shifted from the left to the right-hand side of FIG. 2 by delay elements 622. After the shifting operation is completed, in step 63, the shifted N signs of Se(0), Se(1), ..., Se(N−1) are parallely extracted and used to calculate filter coefficients $h_i$.

The N filter coefficients for an nth sample, $h_0(n)$, ..., $h_{N-1}(n)$, are determined as follows:

$$h_i(n) = \alpha \cdot h_1(n-1) + \beta \cdot Se(0) \cdot Se(i+1) \quad (E1)$$

wherein: n is a positive integer;
i is 0,1, ..., N−1 with N being a positive integer;
$\beta$ is a constant within the range of $2^{-\beta}$ to $2^{-7}$; and
$\alpha$ is $1-\beta$.

$\alpha$ (and $\beta$) may be experimentally determined; and, $\beta$ is preferably, $2^{-6}$.

As shown in FIG. 2, the operation for updating the filter coefficients may be parallely performed by multipliers 631, 632 and 636, registers 634, storing the current filter coefficients, and delay elements 635. As can be seen from equation E1, it should be readily appreciated that the updating operation is not influenced by the size of the error signal, but only by the sign of the error signal; and entails a considerable reduction in the computational complexity.

In step 64, a predicted echo signal S(n) is calculated by using N samples taken from the incoming digital signal Y(n) as follows:

$$S(n) = \sum_{i=0}^{N-1} h_i(n) \cdot Y(n - i) \quad (E2)$$

wherein n, i, N have the same meanings as previously defined.

As shown in FIG. 2, the incoming digital signal Y(n) is shifted by the delay element 641 and then multiplied by the updated filter coefficient $h_i$ in parallel. As may be seen from equation E2, the predicted echo signal S(n) is estimated by using the updated filter coefficients and the size of the incoming digital signal Y(n).

The resulting predicted echo signal S(n) is then subtractively coupled in parallel to the adder 33 (as shown in FIG. 1) which subtracts the predicted echo signal S(n) from the incoming digital signal Y(n) and generates an error signal e(n), representative of the difference between the outgoing and the incoming signals. Preferably, the predicted echo signal S(n) may be coupled to the adder 33 through an amplifier 35 wherein the gain factor K of the amplifier 35 is proportional to the gain factor of the amplifier 22 shown in FIG. 1. From the foregoing, it should be appreciated that the filter coefficient $h_i$ is adaptively updated by using a set of sign functions Se(n) of the error signal; and, therefore, the computational complexity of the predictor 36 can be considerably reduced.

Figure 4:
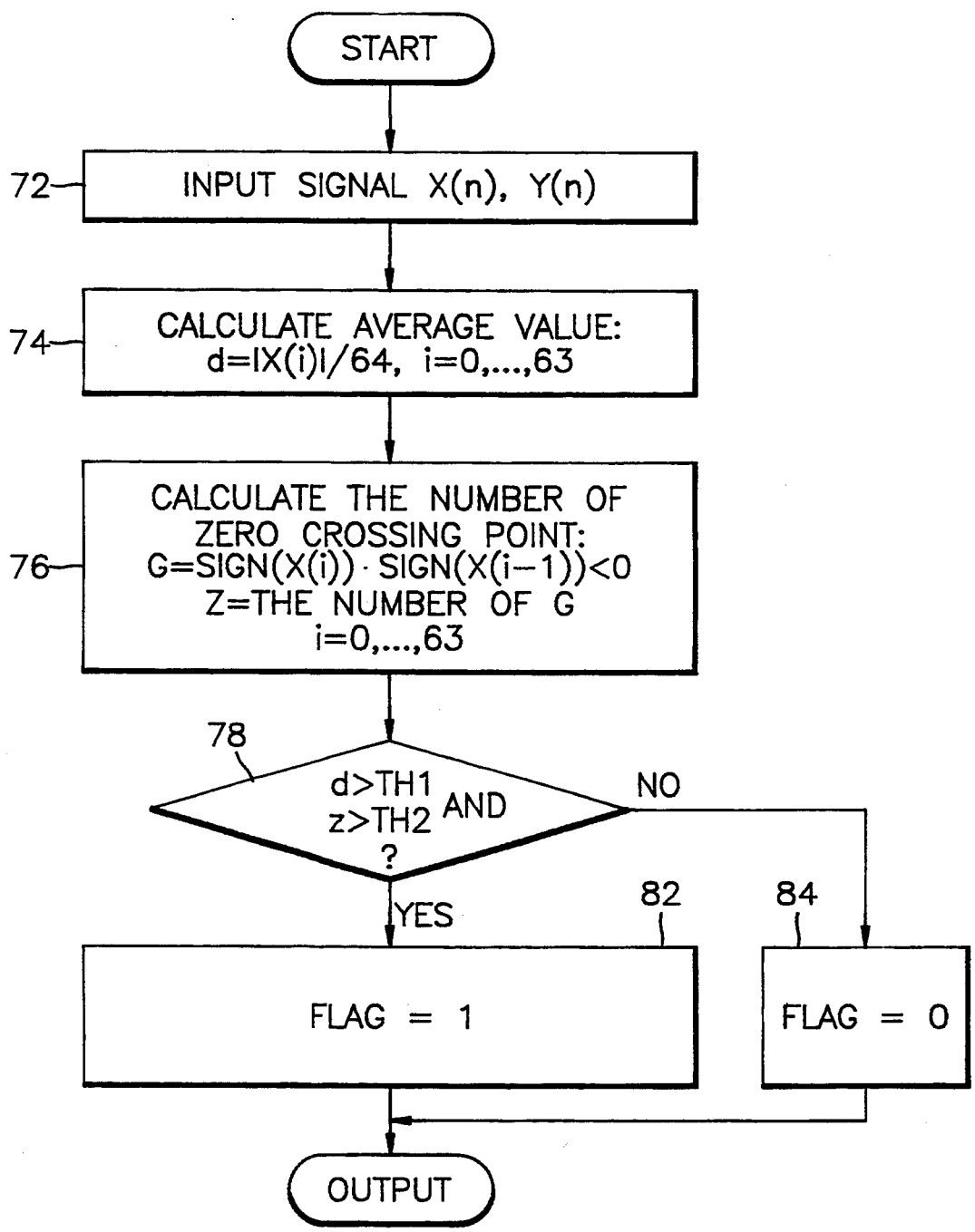
FIG. 4 is a flow chart showing the operation of the first and the second decision circuits shown in FIG. 1.

Referring now to FIG. 4, the operation of the first and the second decision circuits 32 and 34 is illustrated. First, in step 72, the outgoing digital signal X(n) and the incoming digital signal Y(n) are fed to the first and the second circuits 32 and 34, respectively. Thereafter, in step 74, the signals Y(n) and X(n) are divided down by a block which contains M samples; and an absolute mean value of the block is then calculated.

Assuming that the block of signals Y(n) and X(n) contains 64 samples, the absolute mean value of the block(d) is determined as follows:

$$d = |X(i)|/64$$

wherein i=0, 1, 2, 3, ..., 63

When the calculation of the mean value d is completed, step 76 determines the number of zero-crossing points Z contained in the block. This process may be readily implemented by comparing the sign between the samples as follows:

$$G = \text{Sign of } X(i) \cdot \text{Sign of } X(i-1) < 0,$$

wherein, G is a zero-crossing point and i is 0, 1,2,3, ..., 63.

As a result, the number of zero-crossing points Z is attained by summing up all zero crossing points G.

When the absolute mean value d and the number of zero-crossing points Z are obtained, in step 78, they are compared with a first and a second thresholds TH2 and TH2, respectively.

As mentioned above, assuming that the processing block contains 64 samples and each sample is represented by a 16 bit binary signal, the first threshold TH1 is preferably set to 10 and the second threshold TH2 is chosen to 80.

In step 82, the absolute mean value d and the number of zero-crossing points Z is compared with the first and the second thresholds TH1 and TH2.

When both the absolute mean value d and the number of zero-crossing points Z exceed the first and the second thresholds TH1 and TH2, the flag signal of the decision circuits 32 and 38 becomes a logic "1" level; and, otherwise, the flag signal of the decision circuits 32 and 38 becomes a logic "0" level. It means that the first and the second decision circuit 32 and 38 detect an input signal, which satisfies the above condition, as a valid signal.

The relationship between the flag signals of the first and the second decision circuits 32 and 34 and the selection of the adaptive selector are illustrated in Table 1.

TABLE 1

| The flag signal of the first decision circuit | The flag signal of the second decision circuit | The adaptive selector |
|---|---|---|
| 0 | 0 | the first channel selection |
| 0 | 1 | the first channel selection |
| 1 | 0 | the second channel selection |
| 1 | 1 | the third channel selection |

As may be seen from Table 1, the adaptive selector 38 activates the switch 37 to select one of the three channels in accordance with the flag signals of the first and the second decision circuits 32 and 33. That is, when the flag signal of the first decision circuit 32 is of a logic "0" level, the first channel is selected by the adaptive selector 38 and the switch 37, thereby coupling line 50 of the transceiver 40 to the ground. When the flag signal of the first decision circuit 32 is of a logic "1" level and the flag signal of the second decision circuit is logic "0", the second channel is selected.

When the flag signal of the first decision circuit 32 is logic "1" and the flag signal of the second decision circuit 34 is logic 10, the third channel is selected.

Consequently, it should be readily appreciated that when a valid outgoing digital signal X(n) is detected to be absent, the input line 50 of the transceiver unit 40 becomes grounded, thereby blocking the output of the audio input circuit 10 from flowing to the input line 50 of the transceiver 40. On the other hand, when the valid outgoing digital signal X(n) is present and the valid incoming digital signal is recognized to be absent, the outgoing digital signals is directly coupled to the transceiver unit 40; and when the valid outgoing and incoming digital signals are present, the error signal e(n) is coupled to the transceiver unit 40.

While the present invention has been shown and described with reference to the particular embodiments, it will be apparent to those skilled in the art that many changes and modifications may be made without departing from the spirit and scope of the invention as defined in the appended claims.

What is claimed is:

1. In a digital communication system having an audio-processing circuit and a transceiver which transmits an outgoing digital signal over a communication line and receives an incoming digital signal from the communication line, wherein the audio-processing circuit includes an audio input means for converting an outgoing audio wave to the outgoing digital signal and an audio reproduction means for converting the incoming digital signal to an incoming audio wave, an adaptive echo cancellation apparatus for preventing the incoming audio wave from returning to the audio input means, comprising:

a first channel for blocking the outgoing digital signal from flowing to the transceiver;

a second channel for directly coupling the outgoing digital signal to the transceiver;

a third channel for subtracting a predicted echo signal, estimated by using the incoming digital signal, from the outgoing digital signal and for coupling an error signal, representative of the difference between the outgoing and the incoming digital signals, to the transceiver; and a channel selection means responsive to the outgoing digital signal or the incoming digital signal or both for selecting one of the channels.

2. The adaptive echo cancellation apparatus of claim 1, wherein said channel selection means includes:

a first decision circuit connected to the audio input means for detecting the presence of the outgoing digital signal and generating a first decision signal when the outgoing digital signal is detected to be present or for generating a second decision signal when it is absent;

a second decision circuit connected to the transceiver for detecting the presence of the incoming digital signal and generating a third decision signal when the incoming digital signal is present or a fourth decision signal when it is absent; and a selection means connected to the first and the second selection means for selecting the first channel when the second decision signal is received, for selecting the second channel when the first and the fourth decision signals are received, and for selecting the third channel when the first and the third decision signals are received.

3. The adaptive echo cancellation apparatus of claim 2, wherein the third channel further includes a predictor, responsive to the error signal and the incoming digital signal, for producing a predicted echo signal, and an adder for subtractively coupling the predicted echo signal and the outgoing digital signal.

4. The adaptive echo cancellation apparatus of claim 3, wherein the predictor also includes a filter having a filter coefficient $h_i(n)$ which is determined as:

$$h_i(n) = \alpha \cdot h_i(n-1) + \beta \cdot Se(0) \cdot Se(i+1)$$

wherein $Se(\cdot)$ represents the sign of the error signal, and $\alpha$ and $\beta$ are constants with the relationship of $\alpha + \beta = 1$; and the predicted echo signal, $S(n)$, is determined as:

$$S(n) = \sum_{i=0}^{N-1} h_i(n) \cdot Y(n-i)$$

wherein $Y(n)$ is an nth sample of the incoming digital signal, i is $0,1,2,\ldots,N-1$; and n is a positive integer.

5. The adaptive echo cancellation apparatus of claim 4, wherein $\beta$ lies within the range of $2^{-5}$ to $2^{-7}$.

6. The adaptive echo cancellation apparatus of claim 4, wherein the outgoing digital signal includes a predetermined number of samples, and said first decision circuit include:

means for calculating an absolute mean value for the predetermined number of samples; and means for determining the number of zero-crossing points for the predetermined number of samples; and means responsive to the absolute mean value and the number of zero-crossing points for generating the first and second decision signals when the absolute mean value and the number of zero-crossing points exceed a first and a second threshold level, respectively.

7. The adaptive echo cancellation apparatus of claim 6, wherein the incoming digital signal includes a predetermined number of samples, and said second decision circuit includes:

means for calculating an abolute mean value for the predetermined number of samples; and means for determining the number of zero-crossing points for the predetermined number of samples; and means responsive to the absolute mean value and the number of zero-crossing points for generating the first and second decision signals when the absolute mean value and the number of zero-crossing points exceed a first and a second threshold level, respectively.

8. The adaptive echo cancellation apparatus of claim 7, wherein the predetermined number of samples is 64, the first threshold level is 10, and the second threshold level is 80.

* * * * *